United States Patent
Shiokawa et al.

(10) Patent No.: US 10,828,821 B2
(45) Date of Patent: Nov. 10, 2020

(54) LIQUID BLOW MOLDING DEVICE AND PREFORM

(71) Applicant: YOSHINO KOGYOSHO CO., LTD., Tokyo (JP)

(72) Inventors: Mitsuru Shiokawa, Tokyo (JP); Yuichi Okuyama, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 0 days.

(21) Appl. No.: 16/340,368

(22) PCT Filed: Aug. 9, 2017

(86) PCT No.: PCT/JP2017/028989
§ 371 (c)(1),
(2) Date: Apr. 8, 2019

(87) PCT Pub. No.: WO2018/079013
PCT Pub. Date: May 3, 2018

(65) Prior Publication Data
US 2019/0248062 A1 Aug. 15, 2019

(30) Foreign Application Priority Data
Oct. 31, 2016 (JP) .................................. 2016-213735

(51) Int. Cl.
*B29C 49/46* (2006.01)
*B29C 49/58* (2006.01)
(Continued)

(52) U.S. Cl.
CPC .............. *B29C 49/28* (2013.01); *B29C 49/02* (2013.01); *B29C 49/06* (2013.01); *B29C 49/46* (2013.01); *B29C 2049/4294* (2013.01)

(58) Field of Classification Search
CPC ............ B29C 49/46; B29C 2049/4664; B29C 2049/4294; B29C 49/58;
(Continued)

(56) References Cited

U.S. PATENT DOCUMENTS

| 2002/0108958 | A1 | 8/2002 | Britton |
| 2006/0108315 | A1* | 5/2006 | Britton ................. B65D 41/185 215/321 |
| 2016/0082646 | A1 | 3/2016 | Chauvin et al. |

FOREIGN PATENT DOCUMENTS

| CN | 1203546 A | 12/1998 |
| FR | 2219880 A2 | 9/1974 |

(Continued)

OTHER PUBLICATIONS

Apr. 30, 2019 International Preliminary Report on Patentability issued in International Patent Application No. PCT/JP2017/028989.
(Continued)

*Primary Examiner* — Robert B Davis
(74) *Attorney, Agent, or Firm* — Oliff PLC

(57) ABSTRACT

A liquid blow molding device includes a cylindrical nozzle having, at a lower end thereof, a seal surface that, when the nozzle is inserted into a mouth part, abuts on a step surface provided at an inner circumferential surface of a preform in an axial direction to seal a gap between the nozzle and the inner circumferential surface of the preform. The preform has, at the inner circumferential surface thereof, the step surface to be abutted on by the seal surface of the nozzle in the axial direction. The step surface is tapered to be higher on a radial inner side than on a radial outer side.

4 Claims, 3 Drawing Sheets

(51) Int. Cl.
*B29C 49/28* (2006.01)
*B29C 49/02* (2006.01)
*B29C 49/06* (2006.01)
*B29C 49/42* (2006.01)

(58) Field of Classification Search
CPC ... B29C 2049/5803; B29B 2911/14413; B29B 2911/1442; B29B 2911/14341; B29B 2911/14026; B29B 2911/1402
See application file for complete search history.

(56) References Cited

FOREIGN PATENT DOCUMENTS

| | | | | |
|---|---|---|---|---|
| JP | 54086560 A | * | 7/1979 | ............. B29C 49/58 |
| JP | 2000-501037 A | | 2/2000 | |
| JP | 2016-124164 A | | 7/2016 | |
| WO | WO-9719806 A1 | * | 6/1997 | ......... B29C 49/0073 |

OTHER PUBLICATIONS

Sep. 12, 2017 International Search Report issued in International Patent Application No. PCT/JP2017/028989.
May 12, 2020 Extended Search Report issued in European Patent Application No. 17864483.7.
Jun. 2, 2020 Office Action issued in Japanese Patent Application No. 2016-213735.
Jul. 2, 2020 Office Action issued in Chinese Patent Application No. 201780063011.6.

* cited by examiner

LIQUID BLOW MOLDING DEVICE AND PREFORM

TECHNICAL FIELD

The present disclosure relates to a liquid blow molding device that blow molds a synthetic resin-made preform into a liquid-containing container of a predetermined shape, and a synthetic resin-made preform that is blow molded into a liquid-containing container of a predetermined shape by the liquid blow molding device.

BACKGROUND

Synthetic resin-made containers such as bottles made of polypropylene (PP) and bottles made of polyethylene terephthalate (PET) are used to contain, as content liquids, various liquids including beverages, cosmetics, medicines, detergents, and toiletries such as shampoos. Such a container is typically manufactured by blow molding a preform formed of a thermoplastic synthetic resin material such as the above-mentioned materials in a shape having a cylindrical mouth part and a bottomed tubular body part connected to the mouth part.

As blow molding devices for blow molding preforms, liquid blow molding devices are known. A liquid blow molding device supplies a pressurized liquid into a preform preheated to a temperature at which stretchability is developed, to liquid blow mold the preform. The liquid blow molding device includes a cylindrical nozzle, and inserts the nozzle into the mouth part of the preform and supplies the pressurized liquid into the preform through the nozzle. With such a liquid blow molding device, a content liquid to be contained in the container as a product, such as a beverage, can be used as the pressurized liquid supplied into the preform. This eliminates the need for a step of filling the container with the content liquid, and simplifies the production process and the structure of the production device.

In the liquid blow molding device, the nozzle is inserted loosely so as to have a slight gap with the inner circumferential surface of the mouth part of the preform, in order to facilitate insertion into and separation from the mouth part of the preform and also prevent damage to the inner circumferential surface of the mouth part. The liquid blow molding device thus has a seal structure for preventing the liquid supplied into the preform through the nozzle from leaking to outside from between the outer circumferential surface of the nozzle and the inner circumferential surface of the mouth part.

For example, JP 2016-124164 A (PTL 1) describes a liquid blow molding device that has a seal surface at the lower end of a nozzle, wherein when the nozzle is inserted into a mouth part of a preform, the seal surface abuts on a step surface formed at the inner circumferential surface of the mouth part of the preform in the axial direction to seal the gap between the nozzle and the inner circumferential surface of the preform.

CITATION LIST

Patent Literature

PTL 1: JP 2016-124164 A

SUMMARY

Technical Problem

In the conventional liquid blow molding device described in PTL 1, the seal surface is formed as a tapered surface that is slightly lower on the radial (radial direction) inner side than on the radial outer side or a flat surface perpendicular to the axial direction. This induces the possibility that, as a result of the mouth part being subjected to a force in the diameter increase direction due to the pressurized liquid supplied into the preform during liquid blow molding, the mouth part deforms in the diameter increase direction and the liquid leaks out from between the nozzle and the mouth part.

It could therefore be helpful to provide a liquid blow molding device and a preform that can reliably prevent leakage of a liquid from between a nozzle and a mouth part during liquid blow molding.

Solution to Problem

A liquid blow molding device according to the present disclosure is a liquid blow molding device comprising a cylindrical nozzle to be inserted into a mouth part of a synthetic resin-made preform, and configured to supply a pressurized liquid into the preform through the nozzle to blow mold the preform into a liquid-containing container of a predetermined shape, wherein the nozzle has, at a lower end thereof, a seal surface that, when the nozzle is inserted into the mouth part, abuts on a step surface provided at an inner circumferential surface of the preform in an axial direction to seal a gap between the nozzle and the inner circumferential surface of the preform, and the step surface is tapered to be higher on a radial inner side than on a radial outer side.

Preferably, in the liquid blow molding device according to the present disclosure, the seal surface is tapered to be higher on a radial inner side than on a radial outer side.

Preferably, in the liquid blow molding device according to the present disclosure, an outer diameter of the nozzle is smaller than an inner diameter of the preform between the step surface and an open end of the mouth part.

A preform according to the present disclosure is a synthetic resin-made preform configured to be blow molded into a liquid-containing container of a predetermined shape by a liquid blow molding device, the preform comprising: a cylindrical mouth part; a bottomed tubular body part connected to the mouth part; and an annular step surface that is provided at an inner circumferential surface of the mouth part, and increases an inner diameter of the inner circumferential surface toward an open end of the mouth part, wherein the step surface is tapered to be higher on a radial inner side than on a radial outer side.

Advantageous Effect

It is thus possible to provide a liquid blow molding device and a preform that can reliably prevent leakage of a liquid from between a nozzle and a mouth part during liquid blow molding.

DETAILED DESCRIPTION

More detailed description will be given below with reference to drawings.

Figure 1:
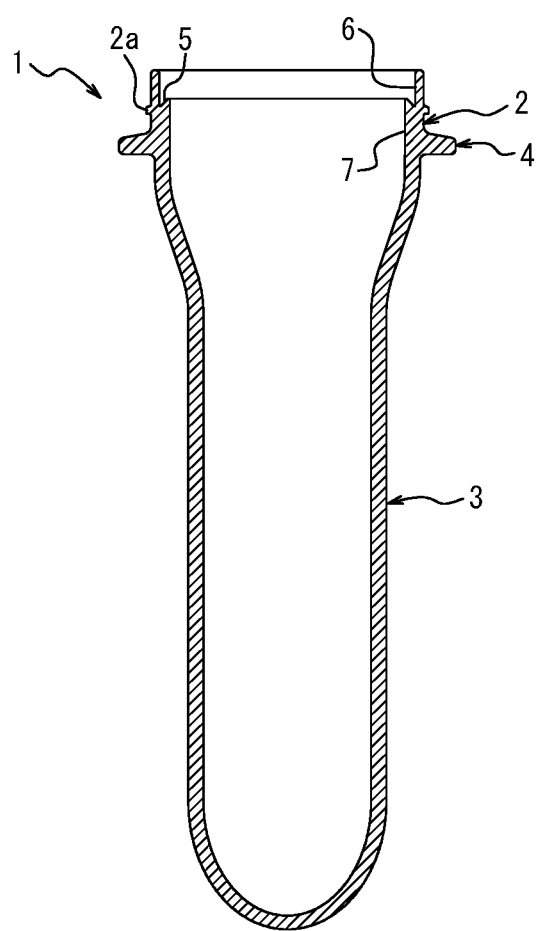
FIG. 1 is a sectional view of a preform according to one of the disclosed embodiments.
Figure 2:
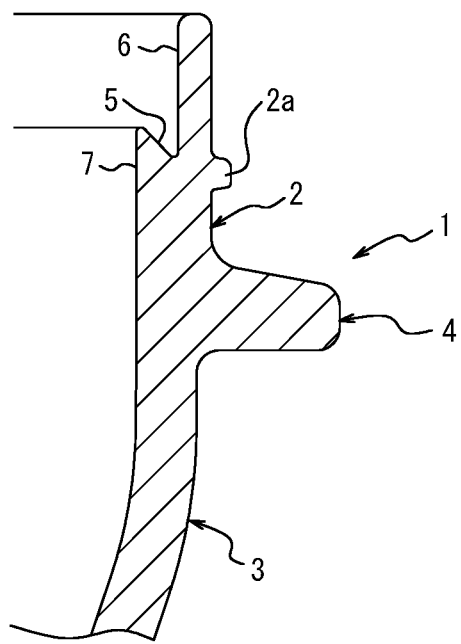
FIG. 2 is an enlarged sectional view illustrating main parts of the preform illustrated in FIG. 1.
Figure 3:
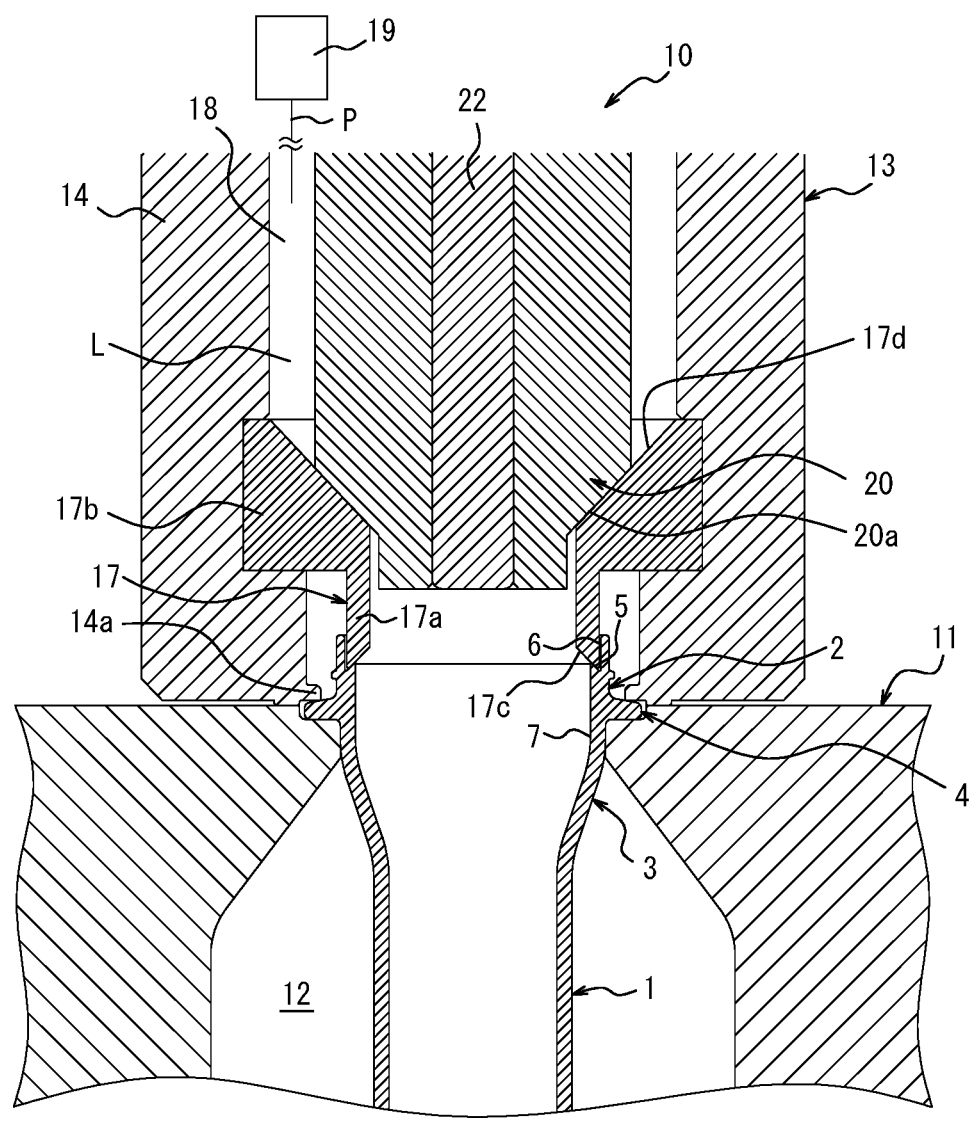
FIG. 3 is an enlarged sectional view illustrating main parts of a liquid blow molding device according to one of the disclosed embodiments.

A preform 1 according to one of the disclosed embodiments illustrated in FIGS. 1 and 2 is liquid blow molded into a liquid-containing container of a predetermined shape using a liquid blow molding device 10 according to one of the disclosed embodiments illustrated in FIG. 3 as an example.

The preform 1 is, for example, made of a synthetic resin material that develops stretchability as a result of heating, such as polypropylene (PP), polyethylene terephthalate (PET), or polyethylene (PE). The synthetic resin material is molded using means such as injection molding, compression molding, or extrusion molding, to form the preform 1 of an approximately test tube shape including a mouth part 2, a body part 3, and a neck support part 4.

The mouth part 2 is a part not stretched by blow molding, and has a cylindrical shape. An annular projection 2a for attaching a cap (not illustrated) to the mouth part 2 by pushing is formed integrally with the outer circumferential surface of the mouth part 2. The annular projection 2a may be replaced with a male screw for attaching a cap by screw joining.

The body part 3 is a part stretched by blow molding. The body part 3 has a bottomed cylindrical shape coaxial with the mouth part 2, and is integrally connected to the lower end of the mouth part 2. In this embodiment, the body part 3 gradually decreases in diameter downward from the part of connection with the mouth part 2 and then maintains a uniform diameter, and has a rounded bottom. The body part 3 is not limited to be bottomed cylindrical, and may have any other shape as long as it is bottomed tubular.

The neck support part 4 has a flange shape projecting radially outward from the outer circumferential surface of the mouth part 2, and is located at the lower end of the mouth part 2.

Although the preform 1 has a single-layer structure made only of one type of resin material, the preform 1 may have a laminate structure in which an outer layer and an inner layer made of different materials or the same material are stacked. In the laminate structure, the inner layer may be provided on the inner side of the outer layer so as to be peelable. The preform 1 may have a laminate structure of three or more layers.

A step surface 5 is provided at the inner circumferential surface of the mouth part 2. When liquid blow molding the preform 1 by the liquid blow molding device 10, the step surface 5 abuts on a seal surface 17c provided at the lower end of a nozzle 17 in the liquid blow molding device 10 in the axial direction, to seal the gap between the nozzle 17 and the inner circumferential surface of the preform 1.

The step surface 5 is tapered (i.e. a tapered surface) to be higher on the radial inner side than on the radial outer side, and has an annular shape extending over the whole circumference of the inner circumferential surface of the mouth part 2. Although the angle of the step surface 5 with respect to the axial direction of the mouth part 2 is 45 degrees in this embodiment, the angle may be varied.

In the mouth part 2, the inner diameter of a large-diameter inner circumferential surface 6 extending from the step surface 5 toward the open end of the mouth part 2 is larger than the inner diameter of a small-diameter inner circumferential surface 7 extending from the step surface 5 toward the body part 3 side, as illustrated in FIG. 2. Thus, the step surface 5 is provided to increase the inner diameter of the mouth part 2 stepwise toward the open end. The inner diameter of the large-diameter inner circumferential surface 6 is uniform in the axial direction.

Although the step surface 5 is directly connected to the large-diameter inner circumferential surface 6 in this embodiment, for example, a flat surface perpendicular to or inclined with respect to the axial direction of the mouth part 2 may be provided between the step surface 5 and the large-diameter inner circumferential surface 6.

The structure of the liquid blow molding device 10 that blow molds the above-described preform 1 into the liquid-containing container of the predetermined shape will be described below.

The liquid blow molding device 10 includes a mold 11 for blow molding, as illustrated in FIG. 3. The mold 11 has a cavity 12 (only part of the upper part is illustrated in FIG. 3) that has a bottle shape corresponding to the shape of the molded liquid-containing container and is open upward at the upper surface of the mold 11. The mold 11 is openable right and left, and the molded liquid-containing container can be taken out of the mold 11 by opening the mold 11, although not illustrated in detail.

The preform 1 can be placed in the mold 11. FIG. 3 illustrates a state in which the preform 1 is placed in the mold 11. The preform 1 is placed in the mold 11 in a standing position with the mouth part 2 being on the upper side, and the mouth part 2 projects upward from the cavity 12.

A nozzle unit 13 is provided above the mold 11. The nozzle unit 13 includes a main block 14 to which the nozzle 17 is attached. The nozzle unit 13 is movable in the vertical direction relative to the mold 11, i.e. capable of ascending and descending, under control of a control device (not illustrated).

The nozzle 17 includes a cylindrical nozzle body 17a whose outer diameter is smaller than the large-diameter inner circumferential surface 6, and a large-diameter sandwiched part 17b formed integrally with the nozzle body 17a. The nozzle 17 may be made of, for example, a steel material or a resin material, and is fixed to the main block 14 as a result of the sandwiched part 17b being sandwiched by the inner surface of the main block 14. A hook part 14a for holding the neck support part 4 with the upper surface of the mold 11 in a sandwiched manner is provided at the lower end of the main block 14.

The nozzle body 17a is coaxial with the cavity 12 of the mold 11, and is movable in the vertical direction relative to the mold 11, i.e. capable of ascending and descending, together with the nozzle unit 13. When the nozzle unit 13 descends to a predetermined position, the part of the nozzle body 17a at the lower end is inserted into the mouth part 2 of the preform 1 placed in the mold 11, and the lower end of the nozzle body 17a abuts on the step surface 5 of the inner circumferential surface of the mouth part 2 in the axial direction at a predetermined pressure.

Figure 4:
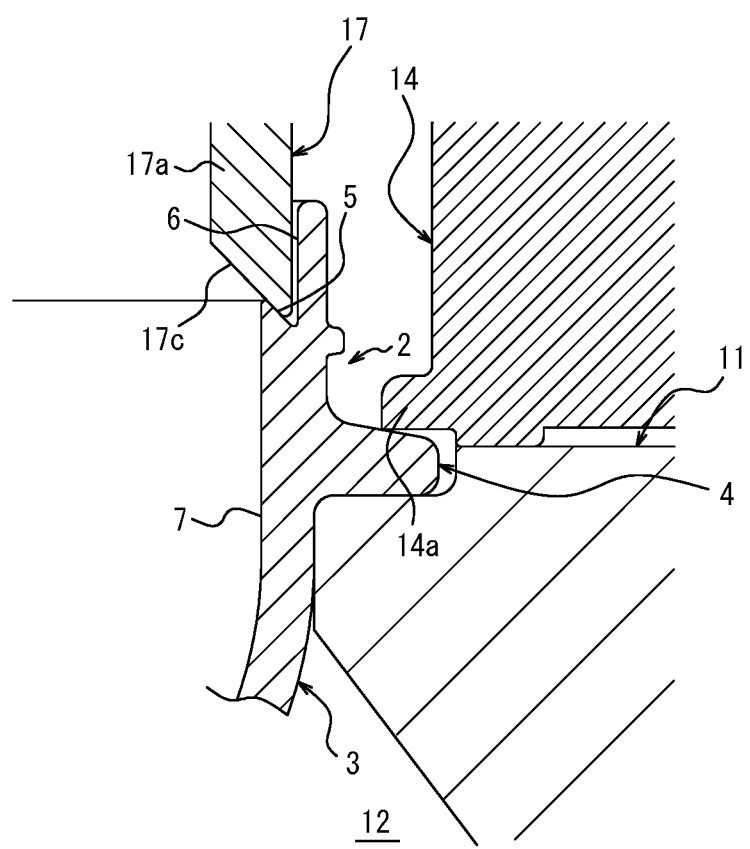
FIG. 4 is an enlarged sectional view illustrating an abutting part of a seal surface and a step surface in FIG. 3.

The lower end of the nozzle body 17a that abuts on the step surface 5 forms the seal surface 17c. The seal surface 17c is tapered to be higher on the radial inner side than on the radial outer side. The angle of the seal surface 17c with respect to the axial direction of the mouth part 2 is the same as the angle of the step surface 5 with respect to the axial direction of the mouth part 2. Accordingly, when the nozzle unit 13 descends to the predetermined position, the seal surface 17c of the nozzle body 17a inserted into the mouth part 2 of the preform 1 abuts on the step surface 5 of the inner circumferential surface of the preform 1 in the axial direction at the predetermined pressure, as illustrated in FIG. 4.

Since the outer diameter of the nozzle body 17a is slightly smaller than the inner diameter of the large-diameter inner circumferential surface 6 of the preform 1, the nozzle body 17a can be easily inserted into the mouth part 2 of the preform 1 without damaging the inner circumferential surface of the large-diameter inner circumferential surface 6 by rubbing against the outer circumferential surface of the nozzle body 17a.

A supply path 18 extending in the vertical direction is formed inside the main block 14. The lower end of the supply path 18 is connected to the nozzle body 17a.

The supply path 18 is also connected to a pressurized liquid supply part 19 through a piping P. The pressurized liquid supply part 19 can supply a liquid L pressurized to a predetermined pressure to the nozzle body 17a through the piping P and the supply path 18.

As the pressurized liquid supply part 19, for example, a plunger pump is preferably used as a pressurization source. However, the pressurized liquid supply part 19 may have any other structure as long as it can supply the liquid L pressurized to the predetermined pressure to the nozzle body 17a.

A seal body 20 for opening and closing the nozzle 17 is provided in the supply path 18. The seal body 20 has a cylindrical bar shape extending along the axis of the supply path 18, and is movable in the vertical direction in the supply path 18. The upper surface of the sandwiched part 17b of the nozzle 17 is a tapered closed surface 17d. When the seal body 20 moves to the lower stroke end and a tapered surface 20a at the tip of the seal body 20 abuts on the closed surface 17d, the communication between the supply path 18 and the nozzle body 17a is blocked by the seal body 20 to close the nozzle 17.

By inserting the nozzle body 17a into the mouth part 2 of the preform 1 and opening the nozzle 17 by the seal body 20 in a state in which the pressurized liquid supply part 19 is in operation, the pressurized liquid L can be supplied into the preform 1 from the pressurized liquid supply part 19 through the nozzle 17 to liquid blow mold the preform 1.

A stretching rod 22 is slidably placed on the inner side of the seal body 20. The stretching rod 22 is movable in the vertical direction (axial direction) relative to the seal body 20. By moving the stretching rod 22 downward relative to the seal body 20, the body part 3 of the preform 1 placed in the mold 11 can be stretched in the vertical direction (axial direction) in the cavity 12. Hence, the liquid blow molding device 10 can perform biaxial stretching blow molding on the preform 1 by stretching the preform 1 in the vertical direction using the stretching rod 22 before or while supplying the pressurized liquid L into the preform 1.

The stretching rod 22 may be omitted from the liquid blow molding device 10.

When liquid blow molding the preform 1 using the liquid blow molding device 10 having such a structure, the preform 1 is placed in the mold 11, and then the nozzle unit 13 is descended to the predetermined position to insert the nozzle body 17a into the mouth part 2 of the preform 1 and cause the seal surface 17c to abut on the step surface 5 of the inner circumferential surface of the mouth part 2 in the axial direction at the predetermined pressure. Since the seal surface 17c and the step surface 5 are tapered surfaces having the same inclination angle, the seal surface 17c and the step surface 5 engage with each other liquid-tightly over the whole circumference, so that the gap between the nozzle 17 and the inner circumferential surface of the mouth part 2 can be sealed. By performing liquid blow molding in this state, the preform 1 can be blow molded into the liquid-containing container of the predetermined shape while supplying the pressurized liquid L into the preform 1 through the nozzle body 17a without leakage of the liquid L from between the nozzle 17 and the mouth part 2.

The seal surface 17c and the step surface 5 are each tapered to be higher on the radial inner side than on the radial outer side. Hence, the step surface 5 engages with the seal surface 17c to be restricted in movement to the radial outer side. Moreover, depending on the axial load imposed on the step surface 5 as a result of the nozzle body 17a abutting on the step surface 5, the mouth part 2 is subjected to a force in the diameter decrease direction toward the radial inner side. The engagement can therefore suppress diameter-increase deformation of the mouth part 2 caused by the pressure of the liquid L supplied into the preform 1. Accordingly, during liquid blow molding, the mouth part 2 can be kept from deforming in the direction in which its diameter increases due to the pressure of the liquid L supplied into the preform 1, thus reliably preventing leakage of the liquid L from between the nozzle 17 and the mouth part 2.

Leakage of the liquid L from between the nozzle 17 and the mouth part 2 can be prevented by a simple structure of merely tapering each of the seal surface 17c and the step surface 5 to be higher on the radial inner side than on the radial outer side, without a complex and expensive mechanism for applying pressure to the outer circumferential surface of the mouth part 2 so as to press the mouth part 2 in the diameter decrease direction. The cost of the liquid blow molding device 10 can thus be reduced.

In addition, since the gap between the nozzle 17 and the mouth part 2 can be sealed inside the mouth part 2, the liquid L can be kept from adhering to the outer circumferential surface of the nozzle body 17a inserted in the mouth part 2.

The present disclosure is not limited to the foregoing embodiment, and various changes can be made without departing from the scope of the present disclosure.

For example, although the seal surface 17c of the nozzle body 17a is a tapered surface that is inclined at the same angle as the step surface 5 in the foregoing embodiment, the seal surface 17c may be a tapered surface that is inclined at a different angle from the step surface 5, a curved surface, or a flat surface perpendicular to the axial direction, as long as the movement of the step surface 5 in the radial direction is restricted.

Although the seal surface 17c at the lower end of the nozzle body 17a abuts on the step surface 5 over the whole circumference to seal the gap between the nozzle body 17a and the mouth part 2 in the foregoing embodiment, the outer diameter of the nozzle body 17a may be equal to the inner diameter of the mouth part 2 to seal the gap between the nozzle body 17a and the mouth part 2 in the radial direction. In such a case, the seal surface 17c may be formed intermittently in the circumferential direction.

REFERENCE SIGNS LIST

1 preform
2 mouth part
2a projection
3 body part
4 neck support part
5 step surface
6 large-diameter inner circumferential surface
7 small-diameter inner circumferential surface 10 liquid blow molding device
11 mold
12 cavity
13 nozzle unit
14 main block
14a hook part
17 nozzle
17a nozzle body
17b sandwiched part
17c seal surface
17d closed surface
18 supply path
19 pressurized liquid supply part
20 seal body
20a tapered surface
22 stretching rod
P piping
L liquid

The invention claimed is:

1. A liquid blow molding device comprising a cylindrical nozzle to be inserted into a mouth part of a synthetic resin-made preform, and configured to supply a pressurized liquid into the preform through the nozzle to blow mold the preform into a liquid-containing container of a predetermined shape,
wherein the nozzle has, at a lower end thereof, a seal surface that, when the nozzle is inserted into the mouth part, abuts on a step surface provided at an inner circumferential surface of the preform in an axial direction to seal a gap between the nozzle and the inner circumferential surface of the preform, and
the step surface is tapered to be higher on a radial inner side than on a radial outer side.

2. The liquid blow molding device according to claim 1, wherein the seal surface is tapered to be higher on a radial inner side than on a radial outer side.

3. The liquid blow molding device according to claim 1, wherein an outer diameter of the nozzle is smaller than an inner diameter of the preform between the step surface and an open end of the mouth part.

4. The liquid blow molding device according to claim 2, wherein an outer diameter of the nozzle is smaller than an inner diameter of the preform between the step surface and an open end of the mouth part.

* * * * *